July 31, 1956     K. KASSCHAU     2,756,858
FUEL CHARGING MACHINE Filed March 23, 1950     6 Sheets-Sheet 1

Fig. 1

INVENTOR.
KENNETH KASSCHAU
BY Roland A. Anderson
Attorney July 31, 1956  K. KASSCHAU  2,756,858
FUEL CHARGING MACHINE
Filed March 23, 1950  6 Sheets-Sheet 2

July 31, 1956 K. KASSCHAU 2,756,858
FUEL CHARGING MACHINE
Filed March 23, 1950 6 Sheets-Sheet 4

INVENTOR.
KENNETH KASSCHAU
BY Roland A. Anderson
Attorney

July 31, 1956   K. KASSCHAU   2,756,858
FUEL CHARGING MACHINE

Filed March 23, 1950   6 Sheets—Sheet 5

INVENTOR.
KENNETH KASSCHAU
BY
Roland A. Anderson
Attorney

July 31, 1956

K. KASSCHAU 2,756,858

FUEL CHARGING MACHINE

Filed March 23, 1950

INVENTOR.
KENNETH KASSCHAU
BY Roland A. Anderson
Attorney

United States Patent Office 2,756,858
Patented July 31, 1956

2,756,858

FUEL CHARGING MACHINE

Kenneth Kasschau, Oak Ridge, Tenn., assignor to the United States of America as represented by the United States Atomic Energy Commission Application March 23, 1950, Serial No. 151,470

6 Claims. (Cl. 193—2)

The present invention relates to the art of loading and unloading fuel into and from nuclear reactors, especially nuclear reactors taking the form of chain reacting piles. The invention is primarily concerned with performing these functions in nuclear reactors having vertical fuel channels although the invention is not necessarily limited to this particular type of reactor as will be apparent from the detailed description following. The invention may, however, also be employed in other types of material handling, and for similar purposes involving the necessity of access to difficult internal positions.

In the loading and unloading of nuclear reactors, it is to be appreciated that difficult problems are encountered in that among other things, the operations must necessarily be conducted behind or within radiation shielding barriers. This, of course, necessitates that the apparatus be adapted to remote control. In the types of piles or reactors with which the invention is primarily concerned, the heat generated is customarily carried away or dissipated by a fluid coolant, and it necessarily follows that the fuel loading and unloading mechanism must involve very effective sealing means to protect against the escape of the radioactive coolant at the point where the loading and unloading apparatus passes through the shell of the reactor. The problem is further complicated by the fact that since control must be from a remote point, the mechanism must be very accurate in its capability to load fuel into or unload it from a desired fuel channel to avoid any dangerous mal-functioning or jamming. The mechanism must also be sufficiently rugged and positive in action to avoid accidents or misoperation which might involve grave hazards in the handling of radioactive material.

The present invention embraces a structural arrangement comprising a single feed tube having adjustable sections (it may be called an adjustable mono-tube), the adjustability of the sections providing for the adjustment of the delivery end to accurately register with any one of a plurality of fuel channels. The loading of the fuel charges or slugs from the machine to the reactor is accomplished by means of a flexible ram operative within the mono-tube. The mechanism is characterized by its capability of being indexed accurately to any one of a plurality of fuel channels simply by rotational movements of the sections of the mono-tube. From this it follows that it is only these rotational movements that must be controlled from the remote point. A preferred form of actuating the sections of the mono-tube is by a planetary gear train arrangement, as will later be referred to in detail.

In addition to the apparatus for loading the fuel charges into the reactor, the invention involves mechanism in the form of a latch member or unit which is charged into the reactor behind a column of fuel slugs and which automatically latches itself in the lower end of an individual fuel channel to retain the column of slugs in position. The latch is capable of being unlatched and rendered operable for removal from the reactor by action of the flexible ram and in this manner unloading of the pile is effected. The latch mechanism itself may take various different forms as will appear hereinafter.

The primary object of my invention is to provide safe, efficient, positive-acting and remotely-controllable means for loading fuel charges into and unloading them from a fluid cooled nuclear reactor.

Another object is to provide loading means for a nuclear reactor comprising a mono-tube or single tube having adjustable sections such that its delivery end can be indexed to any one of a plurality of fuel channels, the tube having a flexible ram operable therein for forcing fuel charges through the tube into the reactor.

Another object of the invention is to provide a driving mechanism for a flexible ram, as referred to in previous objects, comprising a channel in which the ram operates, having adjacent thereto a flexible member parallel to the channel, the flexible member being movable in the direction of movement of the ram and having engagement with a portion thereof for moving the ram in its channel.

Another object of the invention is the provision of a ram driving mechanism as in the previous object wherein the flexible member is in the form of a link chain passing over sprocket wheels adjacent and parallel to the ram channel.

Another object of the invention is the provision of a fuel loading mechanism for nuclear reactors comprising a mono-tube having a straight section aligned with the central axis of the reactor, a first curved section rotatable relative thereto, a second curved section communicating with the first curved section and rotatable relative thereto, the outlet ends of the curved sections being rotatable in planes perpendicular to the central axis of the reactor, and each having the same radius of rotation about its inlet end whereby the outlet end of the second section can be adjusted to coincide with the central axis of the reactor.

Another object of the invention is the provision of a driving means for a mono-tube type fuel delivery mechanism, as referred to in the previous object, comprising a planetary gear train consisting of three gears including a sun gear having an axis coinciding with the central axis of the loading machine, a second gear meshing with the sun gear and rotatable thereabout, and a third gear mounted at the inlet end of the second curved tube section and having its center in line, horizontally, with the centers of the other two gears, the second two gears being operative to move in planetary fashion about the sun gear, the planetary movement of the third gear serving to adjust the delivery end of the second curved tube section.

Another object of the invention is an arrangement as in the foregoing object wherein the third gear is one-half the size of the sun gear, i. e., has half as many teeth, whereby its angular velocity of rotation about its own center is twice that of the angular velocity of its planetary movement about the sun gear, and opposite in direction.

Another object of the invention is the provision of a mechanical movement for producing a straight line motion as the result of movement of parts about pivots comprising a sun gear, an arm rotatable about the same axis as the sun gear and carrying a second gear meshing with the sun gear, a third gear one-half the size of the sun gear meshing with the second gear, the centers of all three gears lying in a straight line; a second rotatable arm having the same center as the third gear and the same radial length as the first arm whereby rotation of the first arm and its gears about the sun gear while the sun gear remains fixed causes rotation of the third gear in the opposite direction on its axis whereby the extremity of the second arm moves in a straight line toward or away from the axis of the sun gear.

Another object of the invention is the provision of a loading apparatus, as in the foregoing object, in combination with a latching device or unit adapted to be fed into a reactor fuel channel by a flexible ram behind a column of slugs, the latch having elements operable to expand and engage a shoulder in the lower end of the fuel channel to thereby latch the device in position for supporting a column of fuel slugs.

A further object of the invention is to provide a latching device as described in the foregoing object consisting of a cylindrical unit having latching fingers expandable outwardly from the unit under the influence of springs, thereby being operative to engage an annular shoulder in a vertical fuel channel to latch the unit in position.

Another object of the invention is to provide a latching unit as in the previous object wherein the latching unit embodies a locking mechanism for locking the latching members in unlatched position, that is, retracted position, the locking member being operative upon the latching elements being retracted or forced inwardly by movement of the latching unit to cause the latching elements to engage with converging side walls of the fuel channel.

Referring to the drawings, Figure 18 is a sectional view taken along line 18—18 of Figure 3.

The mechanism of my invention is characterized by arrangements providing for separate angular and radial adjustments of the delivery end of the mono-tube, whereby the delivery end can be caused to register with any one of a plurality of fuel channels. The mono-tube can be rotated to any desired angular position. The delivery end of the mono-tube, which comprises two joined S-tubes is movable as a result of rotational motion along a straight line passing through the vertical center line of the mechanism, that is, the center line or axis of the straight portion of the tube through which fuel is delivered to the rotatable S-tubes. The first S-tube has simple rotary movement about its inlet end. The second S-tube has planetary movement provided by a planetary gear at its inlet end which is driven by a gear train including a sun gear having its center coinciding with the center line of the straight portion of tube which delivers fuel to the S-tubes. Thus, the modus operandi is that the angular positioning is secured by rotating the entire mechanism as a unit. The radial positioning is secured by the planetary motion of the second S-tube, whereby its delivery end moves radially along a radius extending from the axis of the straight portion of the tube which delivers to the S-tubes. The principles of operation of this mechanism will become more clearly apparent from the detailed description of structure and operation following.

Figure 1:
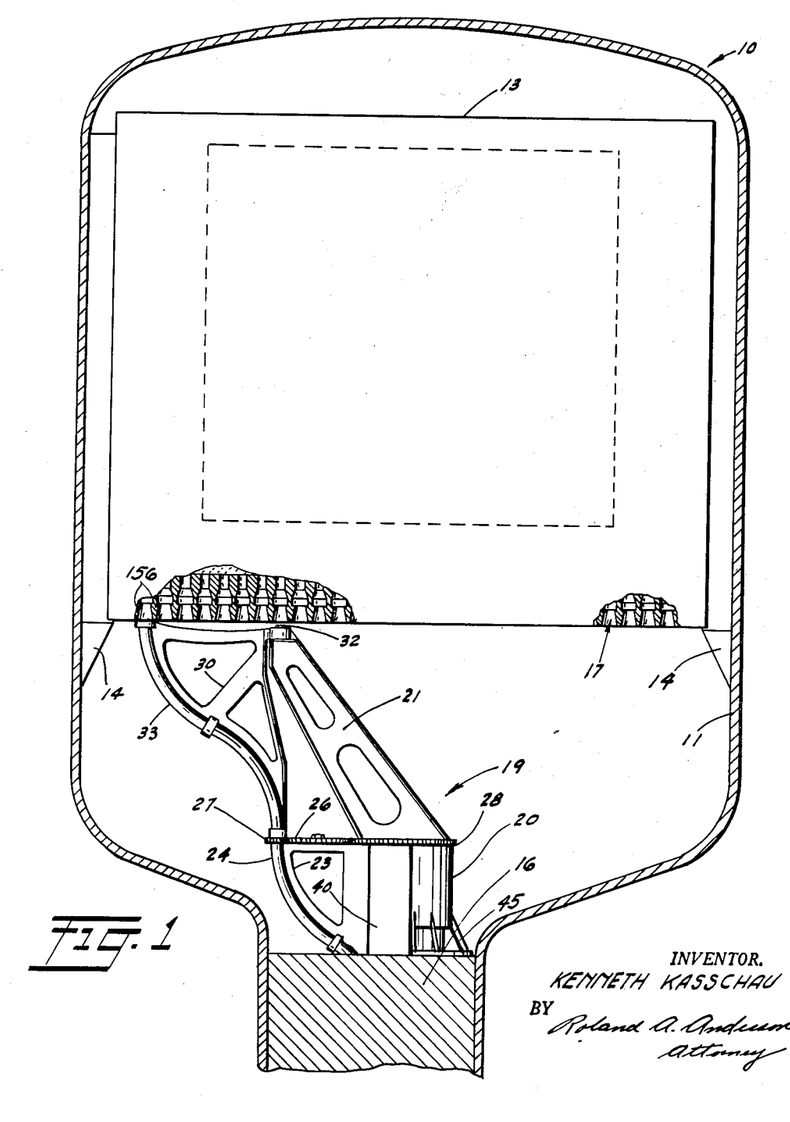
Figure 1 is a diagrammatic view, partly in section, of a nuclear reactor with which my invention may be employed, the upper part of the fuel handling mechanism of my invention being shown.

Referring to Figure 1 of the drawings, numeral 10 designates generally a gas or fluid cooled nuclear reactor which, in the form shown, is a chain reacting pile which may be for the purpose of producing useful power. The reactor unit is enclosed within a pressure shell 11 and the unit itself embodies the usual reactive material and moderator. The unit is designated by the numeral 13, and it is supported on support shoulders 14 within the shell 11. As will be observed, the reactor is spaced from the side walls of the shell and the cooling medium may be circulated around the reactor to cool the shell in addition to being circulated through channels formed in the reactor itself to remove the heat of fission. In practice the entire reactor and shell would, of course, be enclosed by a considerable thickness of biological shielding. Numeral 16 designates a massive structural support for the fuel handling mechanism which passes through it, but which also functions as a portion of the biological shielding and will be referred to herein as a supporting shield.

The cut-away portions of Figure 1 show the vertical fuel channels formed in the reactor as indicated by the numeral 17. The lower ends of these channels have a taper as may be observed and near the ends of these channels there is formed in each one an annular shoulder which will later be referred to again.

The upper portion of the fuel handling mechanism is within the lower part of the shell 11 and is designated by numeral 19, the center line of the handling mechanism coinciding with the center line of the reactor in its pressure shell. As may be observed from Figs. 1 and 2, the delivery mechanism comprises S shaped tube portions 24 and 33. The lower or inlet end of tube 24 passes through the side wall of a vertical hollow shaft 40 and downwardly into concentric relationship to shaft 40 and to shaft liner 43. For reasons which will subsequently become apparent, the hollow shaft 40 will also be referred to herein as the radial adjustment shaft. The inlet end of tube 33 registers with the delivery end of tube 24, as shown. Tube 24 is supported from shaft 40 by a bracket 23 and clamps 41, as shown. Tube 33 is attached by means of clamps 35 to bracket 30, which is pivoted to an arm 21 extending at an angle, as shown, from the upper end of shaft 40. Bracket 30 engages the pivot 32 at the end of arm 21, and this center of rotation is in vertical alignment with the center of the inlet end of tube 33.

The reactor shown in Fig. 1 is of cylindrical construction so that the lower ends of the fuel channels form a plane circular pattern. As shown in Fig. 1, the upper or delivery end of tube 33 is in register with one of the outermost of the vertical fuel channels, but it may be indexed accurately to any one of other fuel channels as will be described presently.

Figures 2, 19:
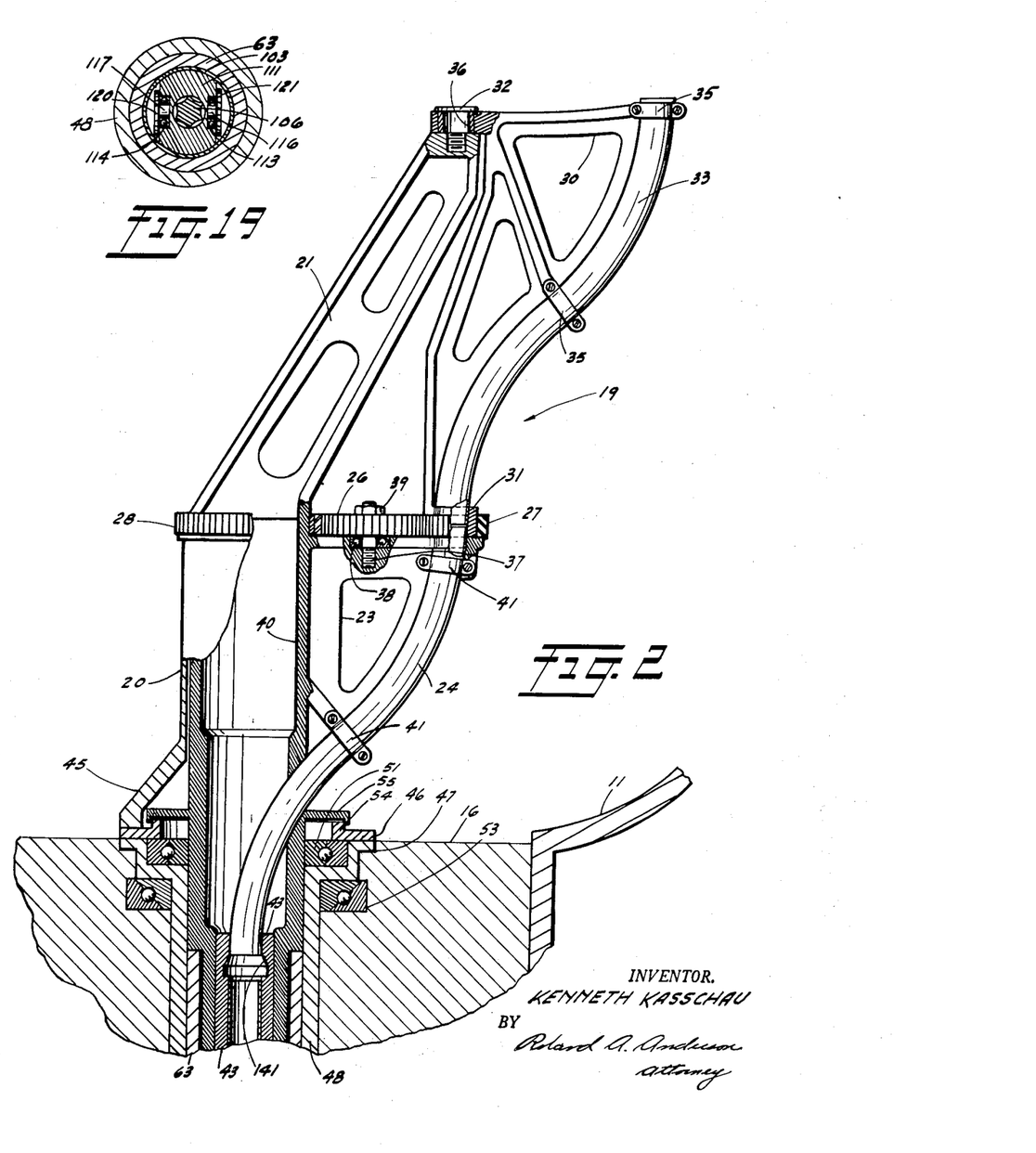
Figure 2 is an enlarged view, partly in section, of the upper portion of the fuel handling mechanism.
Figure 19 is a sectional view taken along line 19—19 of Figure 3.
Figures 11, 16, 17:
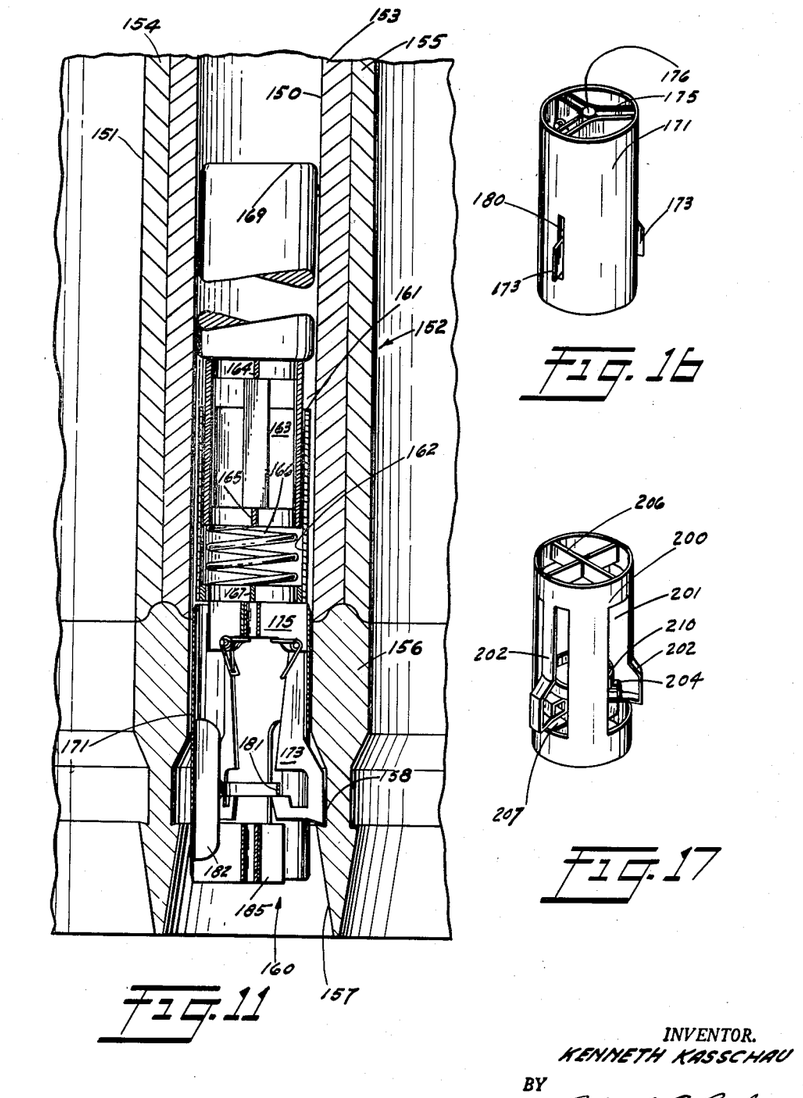
Figure 11 is an enlarged detail view of the lower end of one of the fuel channels of the reactor of Figure 1 showing the latch mechanism in position in the fuel channel.
Figure 16 is an exterior view of the latching unit with the latching fingers in extended position.
Figure 17 is a view of an alternative form of latching unit.
Figure 13:
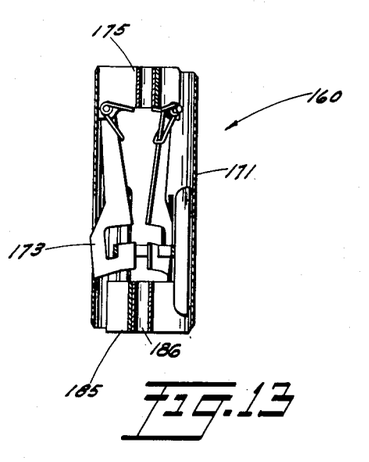
Figure 13 is a sectional view of the latching unit with the latching fingers in retracted or locked position.
Figure 14:
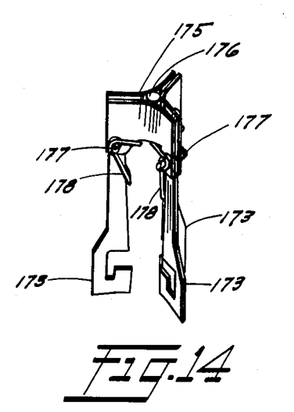
Figure 14 is a detail view of the latching fingers of the latching unit and their manner of support.

Numeral 27 designates a planetary gear integral with and encircling the lower end of mono-tube section 33. Gear 27 meshes with intermediate planetary gear 26 mounted on a pivot 37, carried by bracket 23, having a bearing 38, and being secured by the nut 39. Gear 26 meshes with a central sun gear 28 integral with the end of a semicylindrical sleeve 20 which may be rotated with respect to shaft 40, as will be described. The centers of gears 26, 27 and 28 lie in a straight line, horizontally, and form an epicyclic gear train.

of fuel slugs, if any individual latch finger 173 is accidentally depressed or retracted inwardly as a result of contact with the side wall of the loading tube, downward movement of locking ring 181 is still prevented since all of the latching fingers 173 must simultaneously be in their inwardly retracted positions in order for the locking ring 181 to drop down. When the locking ring 181 falls, it must drop over all three of the up-turned ends of the hook members of the latching fingers, as shown in Fig. 13, and when it is in this position, outward extension of the latching fingers 173 is prevented. The smallest diameter of the tapered inlet 157 of the fuel channel is sufficiently large to prevent the latching fingers 173 from being retracted to the extent required for the locking ring 181 to fall into locking position. During loading, when the latching mechanism 160 reaches the position in which the latching fingers 173 are adjacent or opposite to the annular recess 158, the latching fingers move outwardly under the influence of their biasing springs so that their lower outer corners engage the annular recess 158, as shown in Figure 11. With the latching unit 160 in this position, the flexible ram may be withdrawn and the latching device remains in position in the lower end of the fuel channel supporting the column of fuel slugs above it.

When it is desired to unload a fuel channel, the latching mechanism 160 is moved upwardly approximately one inch by means of the flexible ram. The outer edges of the hook members of latching fingers 173, functioning as cam surfaces, engage the converging tapered surface of the bore of tube 156 above the recess 158, thus moving the latching fingers inwardly so that the upturned ends of their hook members are moved to positions within the confines of the locking ring 181, which then drops down into its locking position, as shown in Figure 13. The column of fuel slugs, and the latching unit 160 may then descend by gravity into the mono-tube upon withdrawal of the flexible ram.

Figures 1B, 3:
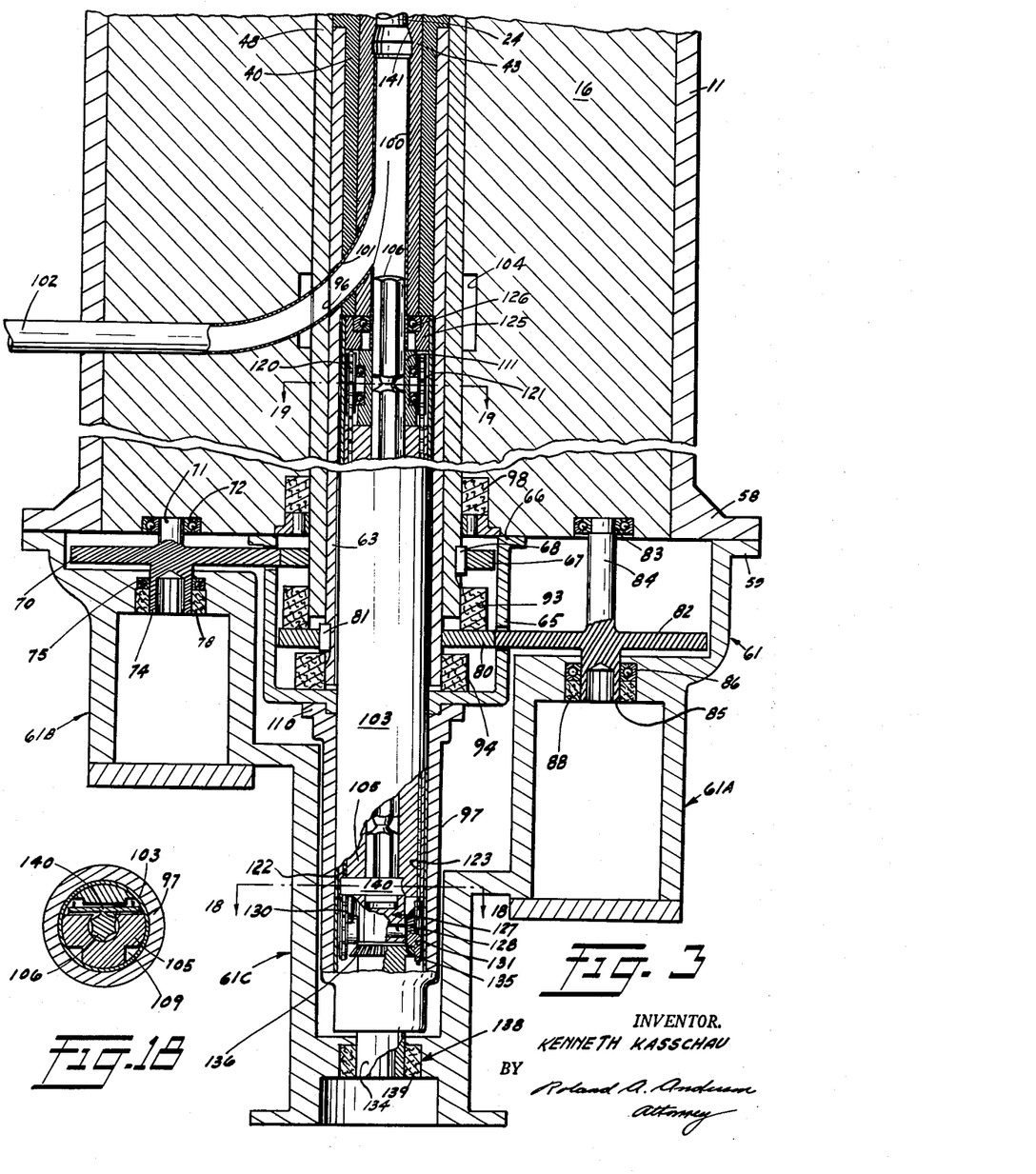
Figure 3 is a sectional view of the lower part of the fuel handling mechanism showing the drives for the mono-tube sections and for the flexible ram.

The structure and operation of the flexible ram, whereby the fuel slugs are forced into or removed from the fuel channels of the reactor, will next be described. In Figure 3, it will be observed that the shaft liner 43 within the hollow shaft 40 has a further metal lining 100, and the flexible ram operates within this lining. The lining 100 comprises a tube having a curved side branch 101 which extends through appropriate openings in the concentric members 43, 40, and 63, into register with an opening or slot 96 in the sleeve 48 and with the end of tube 102 which passes through a horizontal opening in the supporting shield 16 and through the side wall 11 of the pressure shell extension. The tube 102 extends into a gas lock, not shown, from which the fuel slugs are charged through the tube 102 into the tube 100 by means of an additional ram, which is also not shown. An annulus 104 is formed in the supporting shield 16 at the point where the tube 102 passes through the hollow shaft 48 for the passage of helium gas into the tube branch 101 in any angular position of the mono-tube. For this purpose, the opening 96 through shaft 48 comprises a horizontal slot extending 90° around the circumference. Thus, in any angular position of the mono-tube, the slot 96 in shaft 48 provides communication between the helium supply annulus 104 and tube 101.

Figure 4:
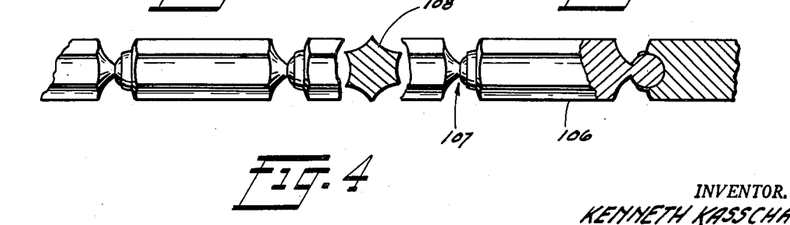
Figure 4 is a view showing cross sections of portions of the flexible ram.

As may be seen in Figure 3, extending downwardly from the housing 65 is another cylindrical housing 97, the upper end of which is enlarged and has a flange 110, as shown, which fits over a cylindrical shoulder on the housing 65, to which it is attached by any suitable means. The lower end of housing 97 is of somewhat reduced diameter, as may be seen in Figure 3. The internal diameter of the main portion of housing 97 is the same as the internal diameter of shaft 63, and mounted within these members is a tube 103. Disposed within the tube 103, but not extending all the way to the ends thereof, is a ram support member in the form of a guide trough 105 in which the ram operates, this member having a cross section as shown in Figure 18. As shown, the member 105 has a central substantially cylindrical bore, and in this bore the flexible ram member 106 slidably fits. The flexible ram is shown in detail in Figure 4, and comprises relatively short, rigid links connected at their ends by ball and socket joints 107. This makes the ram axially rigid but laterally flexible, enabling it to traverse the curves in the mono-tube. The ram sections have shallow curved flutings 108, as shown in Figure 4, thus providing a substantially hexagonal cross section. The purpose of this shape is to permit the passage of inert helium into the reactor during loading or unloading, thus preventing outleakage of radioactive helium. On the sides of member 105 (see Figure 18), and equally spaced from the center of this member, are two angular indentations or shoulders 109, the purpose of which is to accommodate the lower sweeps of two driving chains, as will be described.

Within the tube 103, at the upper end of guide member 105, is a second guide member 111 which has two curved sides engaging the interior of tube 103 and two flat sides spaced from the interior of tube 103. (See Figure 19.) The flat side walls are recessed, as shown, forming retainers for ball bearings 113 and 114 in which are journalled shafts 116 and 117 carrying sprocket wheels 120 and 121. Passing over the sprocket wheels are driving chains 122 and 123, which will be referred to again presently. As shown in Figure 3, the flexible ram 106 passes through both guide members 105 and 111.

Numeral 126 designates a bearing encircling the end of tube lining 100 and this bearing serves to align the ram guides 105 and 111 with the tube lining 100.

At its lower end, the guide member 105 is narrowed in a transverse direction as indicated at 127; and passing through the narrowed portion, transversely, is shaft 128 having mounted on its ends sprocket wheels 130 and 131, as shown. These sprocket wheels are aligned vertically with the previously described sprocket wheels 120 and 121 and the drive chains 122 and 123 pass over both of these sets of sprocket wheels. The sprocket wheel 131 has a bevel gear 135 formed on its inner surface which meshes with a bevel gear 136 on a shaft 134 journalled in the lower end portion of member 97. This shaft extends through an opening in the lower end of housing 61C, and it is internally splined, as shown, to receive the splined shaft of a ram driving motor, not shown. The housing 61C has a counter-bore 138, as shown, forming a retainer for a seal surrounding the shaft 134 as diagrammatically shown at 139. Numeral 140 designates a cross member extending between the two driving chains 122 and 123 above member 105, and this cross member engages the bottom link of the flexible ram to drive the ram up or down as the sprocket wheels and driving chains are operated through the bevel gears.

It will be observed that near the upper end of the liner 43 of shaft 40 (Figure 3) there is an annular recess 141 of the same shape as recess 158 (Figure 11). The purpose of the recess 141 is to support the column of fuel slugs during the interchange of rams, that is, while shifting from one ram to the other.

From the foregoing detailed description, those skilled in the art will understand the operation of the apparatus and system as a whole for loading fuel charges into and removing them from the nuclear reactor. However, the operation of the system as a whole will be briefly summarized in order to present a condensed description of all of the various parts.

Assuming that it is desired to load a column of slugs into a particular one of the fuel channels of the reactor, as shown in Fig. 1, the delivery end of the mono-tube is indexed to that particular channel. The radial adjustment of the mono-tube is accomplished by operation of the gear 82 by its motor drive unit, while the gear 70 is kept in a fixed position. During the operation, gear 28 remains fixed and acts as a reaction gear. The rotation of shaft 40, as a result of operation of gear 82, causes planetary movement of gear 26 about the stationary sun gear 28, as illustrated in Figs. 7 to 10. If shaft 40 is rotated clockwise, looking at Fig. 7, planetary gear 26 rotates clockwise on its axis, rolling clockwise around the gear 28. This motion of gear 26 drives gear 27 in a counterclockwise direction on its axis with the parts assuming the position shown in Fig. 8. In this manner, the delivery end of the mono-tube can be adjusted to any desired radial distance from the center line of the reactor.

To index the apparatus to the desired angular position, the entire mono-tube assembly is rotated as a unit about the central axis of the reactor to the desired position. This is accomplished by rotating the gear 28 and shaft 40 simultaneously, that is, synchronously, by their respective drive motors. When this is done, the epicyclic or planetary gear train and the arms 21 and 30 move as a unit to the desired angular position.

In a loading operation, a column of fuel slugs, followed by the compressible unit 161 and the latching mechanism 160, is first loaded into the apparatus through the tube 102 by the auxiliary ram, as previously described. The auxiliary ram is advanced until the fingers 173 of the latching mechanism 160 engage the intermediate shoulder or recess 141 at the top of tube lining 100. The auxiliary ram is then withdrawn, and the delivery end of the mono-tube 33 is indexed to the desired position. The flexible ram 106 is then placed in operation by starting the ram driving motor. Through the bevel gears previously described, the sprocket wheels and driving chains are actuated and the flexible ram moves upward, traversing the mono-tube and forcing the column of slugs and latching mechanism up into the reactor. As the latching mechanism is forced up into the fuel channel through the tapered inlet 157, as shown in Figure 11, when it is opposite the annular recess 158, the latching fingers 173 move outwardly in the slots 180 and latch the unit against return from the fuel channel. Thus, the latching unit 160 supports the compressible unit 161 and the column of slugs in the channel, and the flexible ram 106 may be retracted.

To withdraw a column of slugs, the flexible ram 106 is operated to move the latching mechanism 160 upwardly approximately one inch and when this happens the outer edges of the latching fingers 173 engage the converging taper within the fuel channel, and they are forced inwardly to retracted position, and the locking ring 181 drops down over the upwardly extending portions of their hook members, locking them in retracted position. The flexible ram 106 may then be withdrawn or retracted, and the column of irradiated slugs, the compressible unit 161, and the latching unit 160 will drop back by gravity to be discharged from the apparatus.

Figure 15:
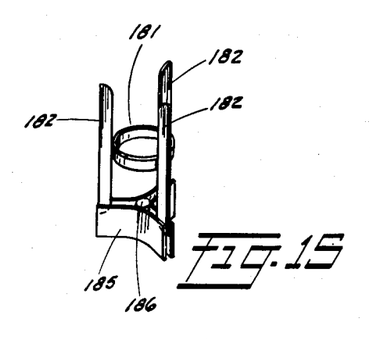
Figure 15 is a detail view of the locking member and its guides, shown as removed from the latching unit.

An alternative form of latching unit is shown in Figure 17 in the form of a cylindrical barrel 200 made of spring steel. The barrel is of a size to fit in the interior of the fuel channel and it has angularly spaced cut-away portions in its sides as shown at 201. Depending from the top of each one of these cut-outs is an integral latching finger 202, the lower part of which is bent outwardly as shown and the bottom of which is bent inwardly, horizontally, as shown and then bent up and over to form a hook as shown at 204, the contour of the finger being thus substantially the same as latching fingers 173. The barrel 200 has a spider 206 in its top end made of crossed members and a similar spider 207 in its lower end. A locking ring 210 is centrally disposed within the barrel 200 and is arranged to slip over the hooked ends of the latching fingers 202 as described in the previous embodiment. The locking ring 210 may be guided as is the locking ring in the embodiment of Figure 15, or alternative forms of guides may be used. The stems of the latching fingers 202 are resilient and are thus adapted to be pressed inwardly into retracted position in the same manner as in the previous embodiment. When not retracted, they extend outwardly beyond the confines of the barrel 200 as in the case of the spring-biased fingers of the previous embodiment.

The foregoing descriptions are illustrative of preferred forms of concrete manifestations of my invention. The disclosure illustrates the principles of construction and operation of the invention, and it is to be understood that these principles may be practiced by those skilled in the art through the medium of various modifications and alternatives in the physical structure and arrangement. It is intended that this disclosure be interpreted as only illustrative, and that the scope of my invention be limited only as indicated by the appended claims.

I claim:

1. In apparatus of the character described, in combination, a machine for loading fuel or the like into elongated channels comprising, in combination, means forming a straight section of tube, means forming a curved section of tube communicating therewith and rotatable relative thereto, a second curved section of tube communicating with said first curved section and rotatable relative thereto, both said curved sections being positioned to rotate about axes parallel to the axis of the straight section of tube, both said curved sections having the same radial dimension as respects their centers of rotation and said second curved section being rotatable to a position wherein its delivery end is aligned with the axis of said straight section.

2. In a machine for feeding fuel or the like, in combination, means forming a straight section of tube, a curved section of tube communicating therewith and rotatable relative thereto, a second curved section of tube communicating with the first curved section and rotatable relative thereto, both said curved sections being rotatable about axes parallel to the axis of the straight section, a sun gear having a center coinciding with that of said straight section of tube, a second gear carried by said first curved section meshing with said sun gear, a third gear at the inlet end of said second curved section and meshing with said second gear for rotating the second section of tubing relative to the first section, and means for rotating the first curved section of tubing about said sun gear whereby the third gear is rotated in the opposite direction so that the delivery end of the second curved section of tubing moves along a straight line passing through the axis of the said straight section.

3. The structure of claim 2, wherein the relative gear sizes are such that the third gear has an angular velocity about its center of rotation twice the angular velocity of the first curved tube section about its center of rotation, whereby the delivery end of the second curved tube section is movable along a radius, toward and away from the axis of the straight tube section.

4. In a mechanical movement, in combination, means forming a sun gear, means forming a first arm carrying a second gear meshing with said sun gear and rotatable about the center of the sun gear, a third gear carried by said first arm and meshing with said second gear, the centers of the three gears lying in a straight line, said first arm being rotatable with respect to the axis of said sun gear, a second arm affixed at its inner end to said third gear and having its outer end free, said second arm being positioned radially of and rotatable with said third gear, the radial distance between the axis of said third gear and the free end of said second arm being equal to the distance between the axes of said sun gear and said third gear, and said gears having such size that when said first arm is rotated said third gear rotates on its axis at twice the angular speed of said first arm whereby the free end of said second arm executes linear motion radially with respect to the axis of said sun gear.

5. The structure of claim 4 wherein said first arm

The sleeve 20 is attached to a ring member 46 by means of arms 45, and member 46 is in turn attached to a flange 47 on the end of hollow shaft 48 which is also referred to herein as the angular adjustment shaft. The upper end of shaft 48 forms an annular retainer for ball bearing 51 providing for relative rotation between the shafts 40 and 48. Shaft 48 fits within a bore in the supporting shield 16, and there is provided an annular retainer space for ball bearing member 53 adjacent shaft 48. Ring member 46 has an annular flange 54 adjacent an extending flange 55 on shaft 40 for the purpose of preventing entrance of dust to the bearing surfaces.

Referring to Fig. 3 of the drawings, the lower end of the pressure shell 11 is flanged as shown at 58, and attached thereto is a corresponding flange 59 of a housing 61 having sub-housing portions 61A and 61B for enclosing motor driving units, as will be described, and a cylindrical housing portion 61C axially aligned with the hollow shafts previously described. Portion 61C encloses a part of the driving mechanism for the flexible ram, as will be described. The lower end of shaft 48 and the lower end of the integral extension sleeve 63 of shaft 40 carry gears, as will be described, which are within a sub-housing 65 having a flange 66 attached by any suitable means to the supporting shield 16. On its lower end, shaft 48 carries a gear 67 attached thereto by a key 68 and this gear meshes with another gear 70, the periphery of which extends into the housing 65 through an opening as shown. One end, 71, of the integral axle of gear 70 is journalled in a bearing 72 mounted in a suitable retainer in the supporting shield 16. The other end, 74, of the integral axle of gear 70 is journalled in a bearing 75, mounted in a retainer in a portion of the sub-housing 61B, and this end of the axle is internally splined, as shown, to receive a splined driving shaft extending from a motor driving unit which would be positioned in the sub-housing 61B. The motor driving unit itself is not a part of this invention and is therefore not shown. A suitable seal, as indicated at 78, is provided between axle member 74 of gear 70 and the adjacent portions of sub-housing 61B. This seal is diagrammatically shown simply as an annular section of sealing material, but it may take various forms as known in the prior art and as will be presently described. The purpose of the seal 78 is to prevent escape of coolant into sub-housing 61B in the event that replacement of a defective drive unit becomes necessary.

The integral extension sleeve 63 of shaft 40 carries a gear 80 attached thereto by a key 81 and this gear meshes with a gear 82, the periphery of which extends through an opening in the side wall of the sub-housing 65. One end, 84, of the integral axle of gear 82 is journalled in a bearing 83 mounted in a suitable retainer in the supporting shield 16. The other end, 85, of the integral axle of gear 82 is journalled in a bearing 86, mounted in a retainer in the sub-housing 61A. The axle member 85 is internally splined, as shown, to receive a splined driving shaft extending from a motor drive unit, not shown, which would be mounted within the sub-housing 61A. A suitable seal is provided between the axle member 85 and the adjacent portions of the sub-housing 61A, as indicated by the annular section of sealing material 88. This seal may be of various known types as will be described in detail presently, in connection with Fig. 5.

A seal is also provided between shaft 48 and sleeve 63 to prevent the escape of coolant between these members. This seal is diagrammatically represented by the annular section of sealing material 93 which is in contact with the face of gear 80 and with the outer end portion of shaft 48. A similar seal is provided, as indicated at 94, to prevent the passage of coolant from the interior of sleeve 63 into sub-housing 65, and a further seal is provided, as indicated at 98, to prevent leakage of coolant from the annulus between shaft 48 and shield 16 into sub-housing 65. These seals will be described in detail in connection with Fig. 6.

From the foregoing, it will be observed that a motor drive is provided for the shaft 48, and a second motor drive is provided for the separately rotatable shaft 40 and its integral liner 43 and integral extension sleeve 63. Thus, from Figure 2, it is to be observed that the gear 28 and the arm 21 are separately rotatable by the motor drives for the purpose of effecting the indexing of the delivery end of the mono-tube.

Figure 9:
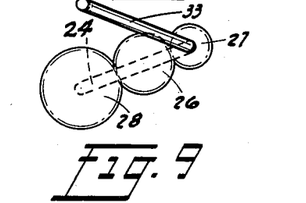
Figure 9 is a similar diagrammatic view with the mono-tube in one-third extended position.
Figure 10:
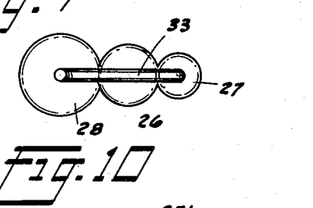
Figure 10 is a similar diagrammatic view with the mono-tube completely retracted.

To effect the radial adjustment of the delivery end of the mono-tube, the gear 70 and consequently shaft 48, sleeve 20, and gear 28 remain fixed, the latter gear acting as a reaction gear. The gear 82 is rotated, which in turn rotates the integral structure comprising gear 80, sleeve 63, shaft 40, bracket 23 and tube section 24, as may be seen on Figure 2. Now looking at Figure 7, assuming that tube section 24 is rotated in a clockwise direction, the gear 26 rolls around reaction gear 28 rotating in a clockwise direction on its own axis. Gear 26 drives gear 27 in a counterclockwise direction on its axis so that the tube sections may assume the position shown in Figure 8, which is a two-thirds extended position of the delivery end of the mono-tube; that is, the delivery end is two-thirds of the maximum attainable distance from the center line of the feed mechanism. It is to be seen that the tube sections 24 and 33, as observed in Figure 8, form the legs of an isosceles triangle, and the delivery end of tube 33 moves in a straight line on a radius extending from the center line of the vertical shaft assembly. Upon continued rotation of tube section 24 in a clockwise direction, the parts move successively through the positions shown in Figures 9 and 10. In Figure 9 the delivery end of the mono-tube is in a one-third extended position and in Figure 10 it is in fully retracted position, that is, it is on the vertical center line of the reactor. The size of the various gears is such that the rotational velocity of gear 27 about its own center is twice the angular velocity of tube 24, and opposite in direction. As can be observed in Fig. 10, while tube section 24 rotates through 90°, section 33 rotates 180° about its inlet end, thus producing the straight line motion of the delivery end of the mono-tube. More specifically, gear 27 has half as many teeth as gear 28, and its rotational speed is thus twice the angular speed of tube 24. The primary purpose of intermediate gear 26 is to cause gear 27 to rotate in a direction opposite to that of arm 24.

To achieve angular positioning of the delivery end of the mono-tube, the shaft 48, sleeve 20, and gear 28 are rotated simultaneously with and in the same direction as shaft 40 and its attached tube section 24. Thus, looking at Figure 7, it will be observed that upon such rotation the tube sections 24 and 33 move as a unit and the gears 26 and 27 do not rotate on their axes. As can be observed, this angular adjustment can be made with the delivery end of the mono-tube in any radial position.

From the foregoing, it can be seen that the delivery end of the mono-tube can be accurately indexed by virtue of its angular and radial adjustability to the entrance of any one of the fuel channels of the reactor.

Figure 5:
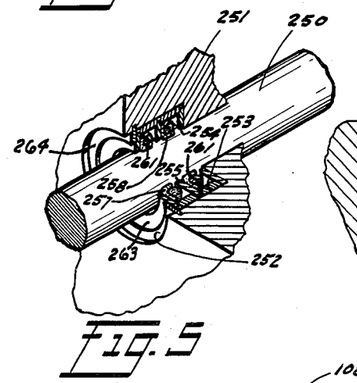
Figure 5 is a view, partly in section, of one of the seals for preventing escape of gas from the pressure shell of the nuclear reactor.
Figure 6:
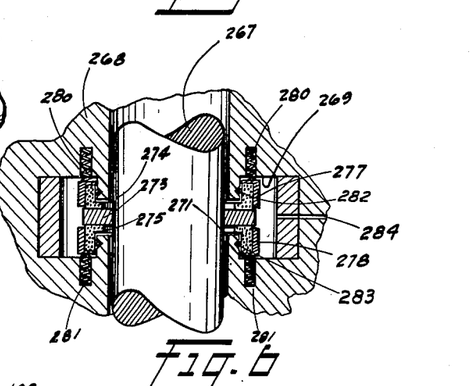
Figure 6 is a cross sectional view of another of the seals.
Figure 7:
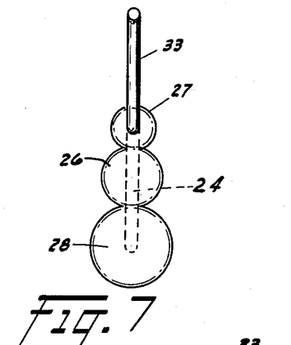
Figure 7 is a diagrammatic end view of the mono-tube sections and operating gear train in fully extended position of the mono-tube.
Figure 8:
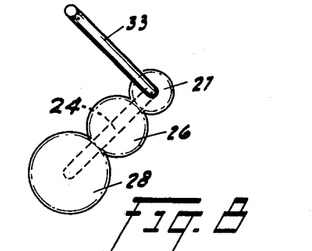
Figure 8 is a similar diagrammatic view with the mono-tube in two-thirds extended position.

Referring to Figures 5 and 6, there are shown diagrammatically, but in greater detail, two types of seals which may be employed to seal the various shaft members, as previously described. The seal shown in Figure 5 is a type which may serve the purpose of the seals diagrammatically shown at 78 and 88 in Figure 3 and Figure 6 shows diagrammatically, but in greater detail, a type of shaft seal which may serve the purpose of the seals shown at 93, 94 and 296 in Figure 3.

In Figure 5, the shaft 250 extends through a member 251, it being necessary to seal against the escape of gas between the shaft 250 and member 251. Member 251 has a counter-bore 252 which is larger than the shaft 250 and fitting within the counter-bore is a ring shaped member 253 having extending therefrom, in planes perpendicular to the shaft 250, flange members 254, 255, and 263, the internal diameters of which are slightly larger than the shaft 250. Flange member 254 serves no sealant function, but is incorporated to complete the integral double-internal-channeled ring structure. Encircling the shaft 250 adjacent the flanges 255 and 263 are gasket members 257 and 258 which are angular in cross section, as shown, each having a surface bearing against the shaft 250 and a surface bearing against one of the flanges 255 and 263. The gaskets are urged against the shaft and their adjacent flanges by toroidal coil springs 261 to effect the desired sealing action. A snap retaining ring 264 secures the seal as a unit.

In Figure 6 a shaft to be sealed is shown at 267 passing through a housing member 268; the space between this member and the shaft is to be sealed against the escape of gas. Formed in the housing 268 is an annular opening 269 which communicates with the bore in member 268 by a narrower annular channel 271. Extending from the shaft 267 at the center of the annular spaces is a flange 273 which rotates with the shaft. Engaging with opposite sides of the flange 273 are ring-shaped seal members 274 and 275 which are angular in cross section, as shown in Figure 6, and which may suitably be formed of graphite. Numerals 277 and 278 designate ring-shaped seal retainers which are angular in cross section, as shown, and which engage the seal rings 274 and 275 and urge them against the flange 273. The seal retainers 277 and 278 are urged against the seal rings 274 and 275 by coil springs 280 and 281, which are disposed in bores in member 268 parallel to the axis of shaft 267. A seal between the graphite rings 274, 275 and the housing 268 is provided by the interposed resilient ring gaskets 282, 283. These gaskets are preferably of somewhat larger normal cross-section than the space to be sealed, and are thus under permanent compression. The friction between the compressed gaskets 282, 283 and the seal rings 274, 275 thus prevents the rings from rotating with the flange 273, but still permits sliding axial motion of the seal rings when they are urged against the flange by the springs 280, 281.

Numeral 284 designates a channel in housing 268, perpendicular to the axis of shaft 267, through which pure helium is admitted to the annular space 269 at a pressure greater than the pressure of the cooling helium seeking to escape between the shaft 267 and member 268. By virtue of the higher pressure of the auxiliary helium supply in the annulus 269, any leakage through the seal between the seal rings and the flange 273 will be inleakage of inert helium rather than outleakage of radioactive helium.

As previously mentioned, my invention involves the use of a latching member or unit below a column of slugs which is operative to latch itself in the lower end of a fuel channel to retain the column of slugs in position. The latch member which is inserted into the reactor by the flexible ram below or behind a column of slugs will next be described. The latch mechanism is shown in detail in Figures 11 to 16.

In Figure 11, the lower end of one of the reactor fuel channels is shown at 150, and the lower ends of two adjacent channels are partially shown at 151 and 152. The channel 150 comprises an internal cylindrical bore in a hexagonal reactor brick 153, and channels 151 and 152 comprise the bores of adjacent hexagonal bricks 154 and 155, respectively. A lower extension of channel 150 is provided by a bore in the supporting grid 156, said bore tapering inwardly, in the fuel-feeding direction, as shown at 157. At the inner, or upper, end of taper 157 is provided an annular recess or shoulder 158. The taper or cam surface 157 and the shoulder 158 co-operate with the latching mechanism, as will be hereafter described. This latching mechanism, as a whole, is designated by numeral 160 in Figures 11, 12, and 13.

There is provided above or ahead of the latching mechanism 160 a compressible unit 161 which in itself is not my invention but is described herein to illustrate the preferred operation of the loading mechanism as a whole. This compressible unit 161 comprises sleeve 162 having fitting therein a plunger 163. Plunger 163 has spiders 164 and 165 in its ends, and the spider 165 bears against a coil spring 166, the other end of which bears against a third spider 167 fixed within the sleeve 162. The member or unit 161 rests on latching unit 160, and the plunger 163 bears against the end of the lower-most of the fuel units 169. The coil spring 166 permits about one inch of compression for a purpose which will be described presently. The invention can be practiced without use of the unit 161, but the use of this unit facilitates the operation.

The latching unit 160 comprises a cylinder 171 of a size to fit within the bore 150, which has three latching fingers as indicated at 173 in the various figures, these fingers being disposed within the cylinder 171 at positions spaced 120° apart. The latching fingers 173 co-operate with the previously described annular latching recess or shoulder 158 in the lower end of the fuel channel as will presently be described. The three latching fingers 173 are suspended within the cylinder 171 from a double-leg spider 175 which is secured within the upper part of the cylinder 171 by any suitable means such as welding. The double leg members of the spider 175 are positioned 120° apart by welding or other suitable attachment to a central tube or stem 176. Each of the latching fingers 173 is suspended between the legs of one of the double leg members of the spider 175 by pivot pins as shown at 177, and each of the latching fingers is normally biased about its pivot pin in a direction away from the axis of the cylinder 171 by means of a spring as indicated at 178. Each of the latching fingers 173 has an outwardly extending but inwardly engaging hook member at its lower end, as shown in the drawings. The cylinder 171 has slots 180 in its side walls, positioned 120° apart, so that the outer portions of the hook members of the latching fingers 173, in their extended position, may protrude through the slots as may be seen in Figure 16, giving the appearance of fins.

The latch fingers 173 when extended, as shown in Figure 16 and also Figure 11, are in a position to engage the annular latching recess 158 in the vertical fuel channel, and the contour of the outer edge of the hook member of each latching finger is such as to form a cam surface adapted to co-operate with the converging tapering surface of the interior of the fuel channel just above the latching recess 158 so that when the latching unit 160 is moved upwardly the latching fingers are moved inwardly toward the axis of cylinder 171, as will be described.

Co-operating with the hook members of the latching fingers 173 is locking ring 181 which is centrally disposed within the cylinder 171, being of smaller diameter and positioned therein by three vertical guide members 182 disposed at 120° intervals around the locking ring 181. These guide members contact the inner surface of the cylinder 171 to maintain the central disposition of the locking ring 181. Numeral 185 designates another spider of construction similar to spider 175, having three double-legs, as shown, and a central tube or stem 186. Guide members 182 are disposed to slide and be guided between the double-legs of the spider 185 to permit vertical guided movement of the locking ring 181. Thus, rotation and lateral displacement of the locking ring 181 is prevented.

Figure 12:
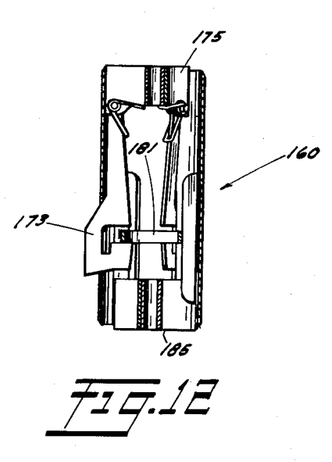
Figure 12 is a sectional view of the latching unit with the latching fingers or elements in extended position.

Figure 12 shows the latching unit 160 with the latching fingers 173 in their outwardly extended position which is the position in which they are shown in Figures 11 and 16, and as may be seen in Figure 11, in this position the outer lower corners of the hook members of the latching fingers engage the annular shoulder or recess 158 in the lower end of the fuel channel. In Figure 12, the locking ring 181 rests on the up-turned portions of the hook members at the lower ends of the latching fingers 173, as may be seen. The locking ring 181 remains substantially in the position of Figure 12 during the loading operation. During loading, with the latching unit behind a column comprises a tube section having one end aligned with the axis of said sun gear and the other end aligned with the axis of said third gear, and wherein said second arm comprises a second curved tube section having its inner end communicating with the outer end of said first tube section and its outer end displaced from the first end a distance equal to the distance between the centers of the sun gear and the third gear, whereby the outer end of the second tube section may be rotated to a position coinciding with the axis of said sun gear.

6. The structure of claim 4 including a tube section carried by said first arm having one end aligned with the axis of said sun gear and the other end aligned with the axis of said third gear, and a second tube section carried by said second arm having its inner end communicating with the outer end of said first tube section and having its outer end parallel to its axis of rotation and radially displaced therefrom a distance equal to the distance from the axis of said third gear to the axis of said sun gear.

References Cited in the file of this patent

UNITED STATES PATENTS

| | | |
|---|---|---|
| 491,127 | Naylor | Feb. 7, 1893 |
| 647,347 | Wellman | Apr. 10, 1900 |
| 1,190,741 | Elvin | July 11, 1916 |
| 1,242,482 | Shotwell | Oct. 9, 1917 |
| 1,278,307 | Cressler | Sept. 10, 1918 |
| 1,428,171 | Lee et al. | Sept. 5, 1922 |
| 1,563,708 | Holthaus et al. | Dec. 1, 1925 |
| 1,570,463 | Damerell | Jan. 19, 1926 |
| 1,977,696 | Purdy | Oct. 23, 1934 |
| 2,213,636 | Niblett | Sept. 3, 1940 |
| 2,256,775 | Hubbell | Sept. 23, 1941 |
| 2,321,526 | Scouten | June 8, 1943 |
| 2,417,128 | Roesch | Mar. 11, 1947 |
| 2,510,483 | Schnepel et al. | June 6, 1950 |
| 2,512,169 | Nachtigal | June 20, 1950 |

OTHER REFERENCES

Marks' Handbook, Third Edition, published by McGraw-Hill Book Co., 1930, pages 861, 862.